United States Patent [19]

Jacobellis

[11] 4,280,533

[45] Jul. 28, 1981

[54] LOW PRESSURE, LOW COST ACCUMULATOR

[75] Inventor: A. A. Jacobellis, Woodland Hills, Calif.

[73] Assignee: Greer Hydraulics, Incorporated, Chatsworth, Calif.

[21] Appl. No.: 93,041

[22] Filed: Nov. 13, 1979

[51] Int. Cl.[3] .................................... F16L 55/04

[52] U.S. Cl. .................................... 138/30; 220/85 B

[58] Field of Search .................... 138/26, 30; 220/85 B

[56] References Cited

U.S. PATENT DOCUMENTS

| | | | |
|---|---|---|---|
| 3,420,273 | 1/1969 | Greer | 138/30 |
| 3,494,378 | 2/1970 | Greer | 138/30 |
| 3,500,866 | 3/1970 | Greer | 138/30 |
| 4,010,773 | 3/1977 | Bihlmaier | 138/30 |
| 4,045,861 | 9/1977 | Zahid | 138/30 |

*Primary Examiner*—James E. Bryant, III

*Attorney, Agent, or Firm*—Arthur B. Colvin

[57] ABSTRACT

The present invention is directed to a dependable, low cost, low pressure accumulator characterized by the provision of a bladder support subassembly secured to an end cap member by an annular weld line, the connection between the noted components being effected prior to insertion of the assembly and end cap into a cylindrical pressure vessel component, whereby the opposed surfaces in registry with the weld are exposed to ambient temperatures, eliminating the danger of damage to the bladder in the course of welding. The bladder subassembly and end cap are thereafter inserted into and weldingly connected to a pressure vessel, the open mouth portion of which is inwardly deformed to overlie the end cap and retainer portion of the bladder subassembly, dependably to secure the components together and to effect the desired seals between adjacent components. The invention is further directed to the method of forming the described vessel.

4 Claims, 3 Drawing Figures

LOW PRESSURE, LOW COST ACCUMULATOR

BACKGROUND OF THE INVENTION

1. Field of the Invention

The present invention is in the field of accumulator devices and is directed more particularly to a low cost, low pressure accumulator device and method of making the same.

2. The Prior Art

The use of accumulator devices for purposes of energy storage, pulsation dampening and the like is progressively increasing. Such devices typically are comprised of a pressure vessel having an oil port at one end communicated with a hydraulic line, and a gas charging valve at the other end, the interior of the vessel being divided into two discrete chambers in communication, respectively, with the gas charging valve and the oil port by a distensible bladder.

When gas under pressure is admitted through the gas charging valve, the bladder is distended into sealing relation of the oil port. When pressure in the hydraulic system exceeds the pressure in the gas chamber, fluids enter the oil port, further compressing the gas, with concomitant storage of energy in the gas or dampening of pulses.

When the pressure in the hydraulic system drops, such that the gas pressure again exceeds the oil pressure, the bladder expands, releasing energy to the hydraulic fluids.

Heretofore accumulator devices have been relatively expensive, in part by reason of the cost of casting or forging the pressure vessel, mounting a bladder assembly in the vessel, and closing the vessel with an end cap assembly carrying a gas charging port.

Generally, the cast or forged pressure vessels must be machined to provide threaded connections for facilitating mounting of the concomitantly threaded end cap.

Additionally, provision must be made for clamping or otherwise supporting a carrier ring bonded to the open mouth of the bladder portion.

In alternative constructions, the bladder portion includes a thickened rim surrounding the mouth, which rim is clampingly engaged between the elements of the pressure vessel which are threaded into position.

The various modes of fabricating and finishing the pressure vessel, supporting the bladder assembly therein and dependably sealing the vessel, as represented by U.S. Pat. Nos. 2345,124—Huber; 3195,576—Mercier; 3963,052—Mercier; 3918,497—Schoon; and 3792,721—Zahid, have materially increased the cost of manufacturing accumulator devices.

While it has been proposed to manufacture accumulator devices, and particularly devices intended to operate at relatively low pressures, of metal parts formed by spinning, etc., the problems inhering in dependably securing the parts together and effecting the desired seal have proven substantial. More particularly, while it has been proposed to connect, by welding operations, the bladder carrying components of a device to the interior of the pressure vessel and thereafter, by a further welding step, to complete the formation of the presure vessel, difficulties, particularly in heat dissipation, have resulted in an inordinate number of instances of failure of the bladder. The welding step has resulted in the conduction of heat to the bladder and/or to the junction between the retainer member for the bladder and the bladder, with frequent resultant failure.

Various attempts have been made to prevent overheating of the bladder in the course of welding, such attempts including the circulation of water against portions of the device to aid in conducting heat away from the bladder. However, no completely satisfactory system for reliably linking the elements of a thin-walled, relatively low cost pressure accumulator device by welding steps has heretofore been achieved.

SUMMARY OF THE INVENTION

The present invention may be summarized as directed to a low cost, low pressure hydraulic accumulator device, the components of which are formed of relatively thin walled material and hence subject to formation by spinning operations without the necessity for complex machining, such as threading, fine finishing etc.

In accordance with the invention, a pressure vessel having an open mouth portion at one end is provided at the other end with an oil port. A bladder subassembly is provided, such subassembly including an axially elongated cylindrical skirt, one end of which is secured to the open mouth portion of a bladder.

A cap assembly is provided, said assembly including a gas charging valve, the cap assembly being insertible into the skirt of the bladder subassembly. The cap assembly itself includes an axially outwardly directed skirt.

Assembly of the components is effected by first forming an annular weld between the skirts at a position displaced from connection with the bladder. Such weld may be formed by a resistance welding operation.

It will be noted that since both the inner and the outer surfaces of the components being connected are exposed to air, heat build-up is minimal.

Thereafter, the combined bladder and cap assemblies are inserted endwisely through the open mouth portion of the vessel into the interior thereof.

A further annular weld connection is defined between the bladder support ring or skirt and the pressure vessel, such further connection being effected at a position closer to the end of the pressure vessel than the first formed weld between the cap assembly and the bladder support ring or skirt. The noted welds provide dependable seals against the passage of gas or hydraulic fluid.

In order further to assure the dependable connection of the components, the juxtaposed ends of the pressure vessel and the bladder support ring are inwardly deformed to overlie the cap member, preferably by a swaging or spinning operation, utilizing the outer end of the cap member as a fulcrum, to complete formation of the device.

Accordingly, it is an object of the invention to provide a low pressure, low cost accumulator device.

A further object of the invention is the provision of an accumulator device of the type described having relatively thin walled metal components comprising a pressure vessel, a bladder suport member including a ring or skirt, and a cap assembly, which are interconnected by annular resistance welds, the weld between the cap assembly and the bladder support skirt being effected in advance of insertion of the cap and bladder subassembly into the interior of the pressure vessel, whereby the heat of welding is effectively dissipated to preclude damage to the bladder.

A further object of the invention is the provision of a device of the type described wherein the parts are dependably secured in a desired orientation by a final swaging or spinning step.

Still a further object of the invention is the provision of a method of forming an accumulator device of the type described.

To attain these objects and such further objects as may appear herein or be hereinafter pointed out, reference is made to the accompanying drawings, forming a part hereof, in which.

Figure 1:
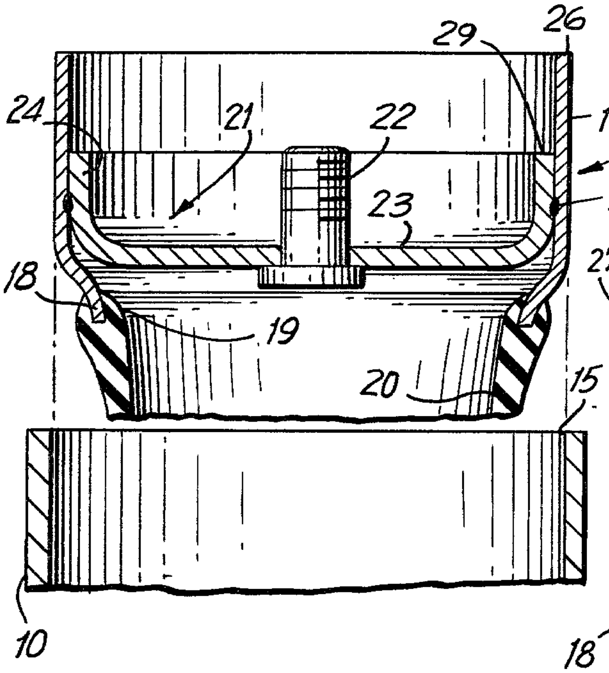
FIG. 1 is a fragmentary vertical sectional view through the components of the device following an initial assembly step.
Figure 2:
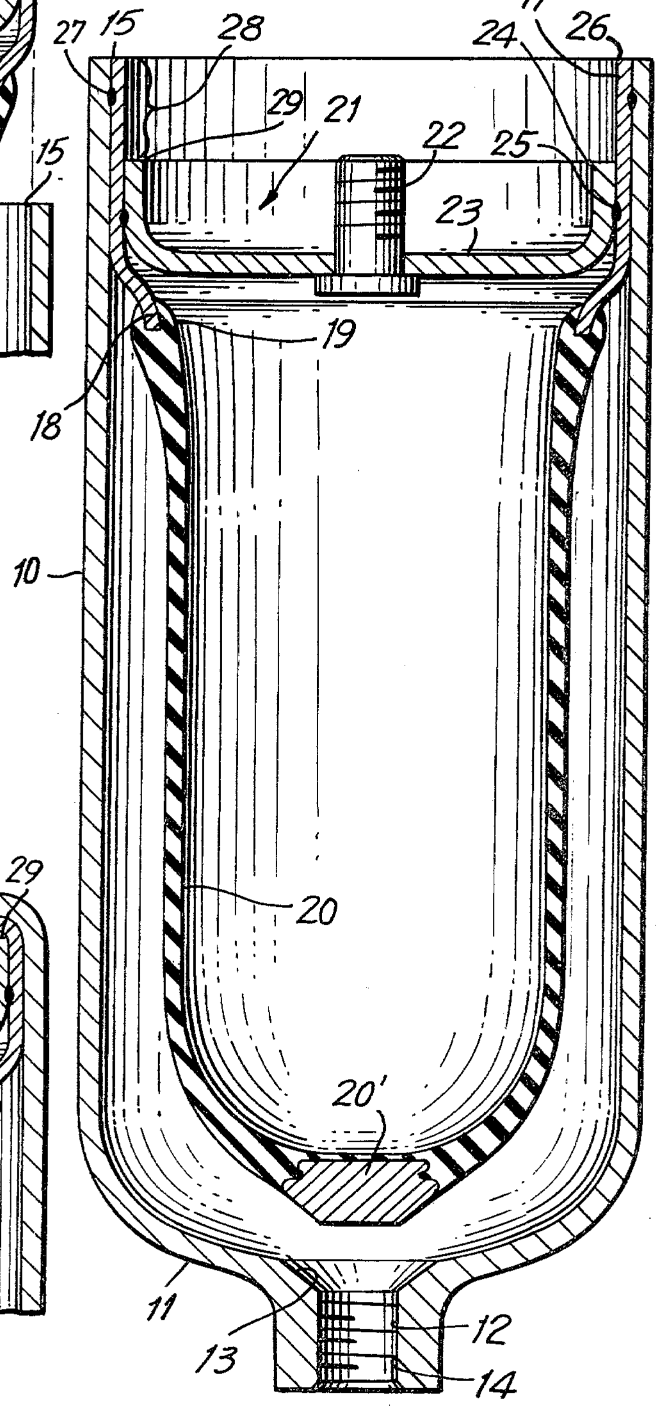
FIG. 2 is a vertical sectional view of the accumulator device at a further step of its formation.

Referring now to the drawings, there is disclosed an accumulator device comprising a pressure vessel 10, the lower end 11 of which is generally hemispherical and includes an oil port 12 preferably having a beveled valve seat 13 formed at the junction with the oil port. Means, such as an internal threaded area 14, may be provided to effect connection of the oil port with a hydraulic system.

The uppermost end 15 of the pressure vessel defines an open mouth portion.

The device includes a bladder subassembly 16 including a generally cylindrical metallic skirt 17, the lowermost or bladder retainer portion 18 of which is inturned to provide an annular anchoring area for the thickened rim portion 19 of a bladder member 20. The bladder member 20, which is made of a distensible elastomeric material preferably includes a button or valve 20' at its lower end.

The thickened rim portion 19 of the bladder may be bonded to or molded insitu over the portion 18 of the bladder retainer skirt 17.

A cap member 21 is provided, which cap member defines the uppermost wall of the accumulator device. The cap member may include a gas charging valve assembly, shown diagrammatically at 22, extending through the circular wall 23 of the cap.

The cap assembly 21 includes a cylindrical, outwardly directed short skirt portion 24, the outer circumference of which forms an intimate fit with the inner circumference of the bladder retainer ring or skirt 17.

In assembling the device, the cap member 21 is sleeved inwardly into the ring or skirt 17 and an annular resistance weld 25 is formed between the juxtaposed skirts 17 and 24.

The method of forming a resistance weld is essentially conventional, involving pressing the opposed electrodes against the opposite faces of the members 17 and 24 while progressively relatively rotating the side members in the noted contact with the electrodes while passing a welding current between the electrodes.

Alternative welding methods may be employed, it being important to note, however, that in the course of attachment of the bladder carrying ring 17 to the cap assembly 21, all portions of the members connected are exposed to the atmosphere or to the flow of cooling gases. Accordingly, since assembly of the cap and bladder support ring is effected prior to the insertion of the components into the interior of the pressure vessel, the likelihood of overheating and consequent damage to the bladder is greatly reduced, if not completely eliminated.

Additionally, the annular weld 25 provides an effective gas-tight seal between the ring 17 and the skirt 24.

FIG. 1 discloses the components after formation of the weld 25.

The next step in assembly involves advancing the bladder subassembly and attached cap 21 into the interior of the pressure vessel through the open mouth portion 15. The external circumference of the ring 17 closely interfits with the circumference of the internal diameter of the pressure vessel 10.

Axial movement of the ring 17 is effected until the outer edge portion 26 is in alignment with the open mouth or end portion 15 of the pressure vessel. Thereafter, a second annular weld 27 is effected, as previously described, between the pressure vessel and the ring 17, such weld providing a dependable seal against the escape of oil between the superimposed parts.

Figure 3:
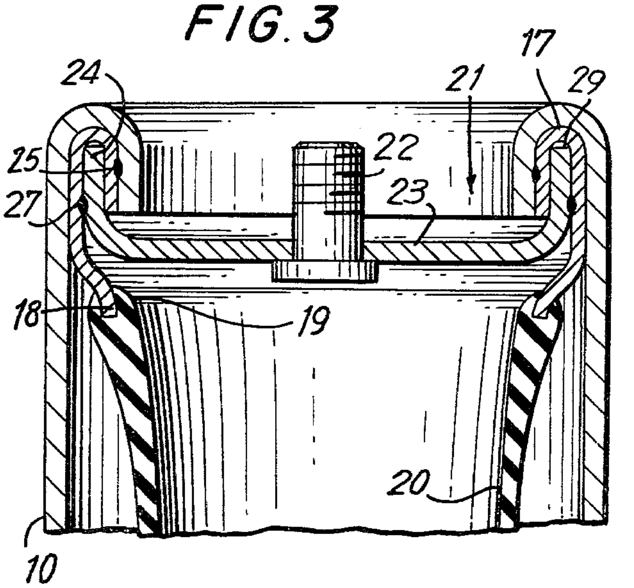
FIG. 3 is a view similar to FIG. 1 showing the parts in their final disposition after assembly has been completed.

While the noted welds provide strong structural support, maintaining the parts in their assembled condition, further reinforcement is desirably provided by rolling or forming the portions 28 above the level of the uppermost end 29 of the cap 21 inwardly, as shown in FIG. 3, over the fulcrum defined by the edge 29. After the rolling, swaging or spinning operation, the parts will occupy the position shown in FIG. 3 and the device will be ready for use.

From the foregoing description it will be evident that an effective gas seal is defined between the parts 17 and 24 by the weld 25, and that since the weld is effected while both surfaces being connected are exposed to the atmosphere, the danger of overheating, with consequent damage to the bladder, is greatly reduced.

It will be further observed that the weld 27 similarly forms an effective seal against the leakage of oil. Although the weld 27 is effected after the bladder is positioned within the pressure vessel, the weld is formed in such manner that both connected surfaces are likewise exposed to the atmosphere for efficient cooling. Additionally, the weld 27 is formed at a position further from the bladder than the weld 25, providing additional assurance against damage to the bladder.

From the foregoing description it will be readily recognized that there is provided an inexpensively manufactured and dependably sealed accumulator device, the principal assembling of which is effected by two annular welds and a simple spinning or swaging step.

It will be further understood by those skilled in the art and familiarized with the instant disclosure that variations may be made in the specifics of the disclosure without departing from the spirit of the invention. Accordingly, the invention is to be broadly construed within the scope of the appended claims.

Having thus described the invention and illustrated its use, what is claimed as new and is desired to be secured by Letters Patent is:

1. An accumulator device comprising a generally cylindrical pressure vessel including a closed end and an open end, an oil port formed in said closed end, a bladder subassembly mounted in said vessel, said bladder subassembly including an axially elongated cylindrical mounting skirt member having a bladder fixedly secured to one end thereof, a cap including an end wall disposed within said skirt and a cylindrical side wall extending away from said one end, said side wall being weldingly connected to said skirt along a first annular weld line spaced from said one end of said skirt, said weld line defining a seal between said side wall of said cap and said skirt, a gas charging port formed in said end wall of said cap, a second annular weld line connection formed between said skirt and said vessel at a position intermediate said first weld line and said open end of said vessel, said second weld line connection defining a seal between said skirt and said vessel whereby said bladder divides said vessel into two chambers communicating, respectively, with said oil and said gas ports and said bladder and cap are dependably secured to said vessel.

2. A device in accordance with claim 1 wherein said open end portion of said vessel is inwardly deformed into overlapping relation of said skirt to provide additional anchorage of said skirt to said vessel.

3. A device in accordance with claim 2 wherein said open end portion of said vessel is inwardly deformed into overlapping relation of said side wall of said cap to provide additional anchorage of said cap to said skirt.

4. A device in accordance with claim 1 wherein said other end of said skirt and said open end of said vessel are coterminous and are inwardly deformed into overlapping relation of said side wall of said cap about a fold line defined by the edge portion of said side wall to provide additional anchorage of said cap and said skirt.

* * * * *